(12) United States Patent
Bryan et al.

(10) Patent No.: US 8,346,421 B2
(45) Date of Patent: Jan. 1, 2013

(54) METHOD AND SYSTEM FOR INITIATING STARTING OF AN ENGINE IN A HYBRID ELECTRIC VEHICLE

(75) Inventors: Paul S. Bryan, Belleville, MI (US); Christopher A. Lear, Dearborn, MI (US); Mike P. Lindlbauer, Canton, MI (US); Linda K. Ringlein, Berkley, MI (US); William David Treharne, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 12/729,424

(22) Filed: Mar. 23, 2010

(65) Prior Publication Data

US 2010/0250039 A1 Sep. 30, 2010

Related U.S. Application Data

(60) Provisional application No. 61/162,823, filed on Mar. 24, 2009, provisional application No. 61/165,710, filed on Apr. 1, 2009.

(51) Int. Cl.
*B60W 20/00* (2006.01)
*B60W 10/06* (2006.01)
*B60W 10/08* (2006.01)
*B60K 6/00* (2007.10)

(52) U.S. Cl. ........... 701/22; 477/2; 477/3; 477/7; 701/1; 701/36; 701/99; 701/113; 180/65.1; 180/65.21; 180/65.265; 180/65.275

(58) Field of Classification Search .................. None
See application file for complete search history.

(56) References Cited

U.S. PATENT DOCUMENTS

| 6,118,237 | A  | * | 9/2000  | Kikuchi et al. .............. 318/139 |
| 6,421,599 | B1 | * | 7/2002  | Lippa et al. ................... 701/102 |
| 6,480,767 | B2 | * | 11/2002 | Yamaguchi et al. ............ 701/22 |
| 6,624,527 | B1 | * | 9/2003  | Crombez et al. ............ 290/40 C |

(Continued)

FOREIGN PATENT DOCUMENTS

JP 2002176794 * 6/2002

(Continued)

OTHER PUBLICATIONS

Chalgren, Jr., Robert D., et al., Sae International, SAE Technical Paper Series, 2003-01-3416, Development and Verification of a Heavy Duty 42/14V Electric Powertrain Cooling System, Nov. 10-12, 2003, pp. 1-11.

*Primary Examiner* — Thomas Black
*Assistant Examiner* — Tyler Paige
(74) *Attorney, Agent, or Firm* — David B. Kelley; Brooks Kushman P.C.

(57) ABSTRACT

A system and method is provided for initiating starting of an engine in a hybrid electric vehicle (HEV) for a first time since a vehicle drive start request. Based on a predetermined fluid temperature and a powertrain fluid temperature from at least one of the powertrain elements in the HEV, it is determined whether energy from the engine is demanded. When the energy from the engine is demanded, the engine is started to provide energy for at least one of heating of a cabin compartment in the HEV and lubrication of a portion of powertrain elements in the HEV.

20 Claims, 5 Drawing Sheets

U.S. PATENT DOCUMENTS

| | | | |
|---|---|---|---|
| 6,709,362 B2* | 3/2004 | Tomohiro et al. | 477/3 |
| 7,021,409 B2* | 4/2006 | Tamor | 180/65.25 |
| 7,213,665 B2 | 5/2007 | Yamaguchi et al. | |
| 7,237,521 B2 | 7/2007 | Yuya et al. | |
| 7,325,595 B2* | 2/2008 | Homan et al. | 165/204 |
| 7,503,413 B2 | 3/2009 | Jiang et al. | |
| 8,047,274 B2* | 11/2011 | Oomura | 165/202 |
| 2003/0033074 A1* | 2/2003 | Lippa et al. | 701/102 |
| 2004/0055800 A1* | 3/2004 | Katou et al. | 180/65.2 |
| 2004/0069546 A1* | 4/2004 | Lou et al. | 180/65.2 |
| 2006/0016412 A1 | 1/2006 | Butcher et al. | |
| 2007/0135988 A1* | 6/2007 | Kidston et al. | 701/102 |
| 2008/0154455 A1* | 6/2008 | Hidaka et al. | 701/22 |
| 2008/0182722 A1 | 7/2008 | Colvin et al. | |
| 2008/0234915 A1* | 9/2008 | Nomasa et al. | 701/102 |

FOREIGN PATENT DOCUMENTS

| | | |
|---|---|---|
| WO | 9625591 A1 | 8/1996 |

* cited by examiner

METHOD AND SYSTEM FOR INITIATING STARTING OF AN ENGINE IN A HYBRID ELECTRIC VEHICLE

CROSS-REFERENCE TO RELATED APPLICATIONS

This application claims the benefit of two U.S. Provisional Applications: (1) U.S. Provisional Application having Application No. 61/162,823 and filed Mar. 24, 2009, the entire disclosure of which is incorporated by reference herein; and (2) U.S. Provisional Application having Application No. 61/165,710 and filed Apr. 1, 2009, the entire disclosure of which is incorporated by reference herein.

BACKGROUND

1. Technical Field

Method and system for initiating starting of an engine in an automotive vehicle.

2. Background Art

Various energy management systems have been developed for automotive vehicles to achieve the best possible fuel economy as well as to reduce undesirable tailpipe emissions. During a given driving cycle, a hybrid electric vehicle (HEV) with an internal combustion engine typically consumes petroleum-based fuel most efficiently and achieves the best petroleum-based fuel economy and the lowest tailpipe emissions when the combustion engine is shut off during a part of the driving cycle as an electric motor in the HEV uses power from an electric battery to propel the HEV. However, it may be desirable or necessary to start the engine in the HEV to provide energy for transmission lubrication and/or for heating in the HEV.

SUMMARY

A system and method is provided for initiating starting of an engine in a hybrid electric vehicle (HEV) for a first time since a vehicle drive start request. The HEV has powertrain elements and a cabin compartment. The start request, a predetermined fluid temperature, and a powertrain fluid temperature from at least one of the powertrain elements in the vehicle are obtained. Based on the fluid temperatures, it is determined whether energy from the engine is demanded. When the energy from the engine is demanded, an initiation for starting the engine occurs for a first time since the start request to provide energy for at least one of heating of the cabin compartment and lubrication of a portion of powertrain elements in the HEV.

DETAILED DESCRIPTION

An embodiment of the present invention generally comprises a method and system for initiating starting of an engine in a hybrid electric vehicle (HEV) for a first time since a vehicle drive start request. Thus, the vehicle may be in an electric drive mode when the engine is started for the first time. The vehicle may be any type of HEV that includes an engine, such as a plug-in hybrid electric vehicle, a hybrid fuel cell electric vehicle (FCEV), et cetera. Starting of the engine can be controlled to generate heat for a cabin compartment in the HEV. It may be desirable or necessary to transfer heat generated from the engine to the cabin compartment to increase passenger comfort in the HEV. In addition, starting of the engine can be controlled to provide energy for transmission lubrication in the HEV. It may be desirable or necessary that a transmission in the vehicle have sufficient lubrication before a torque is applied to the transmission.

Figure 1:
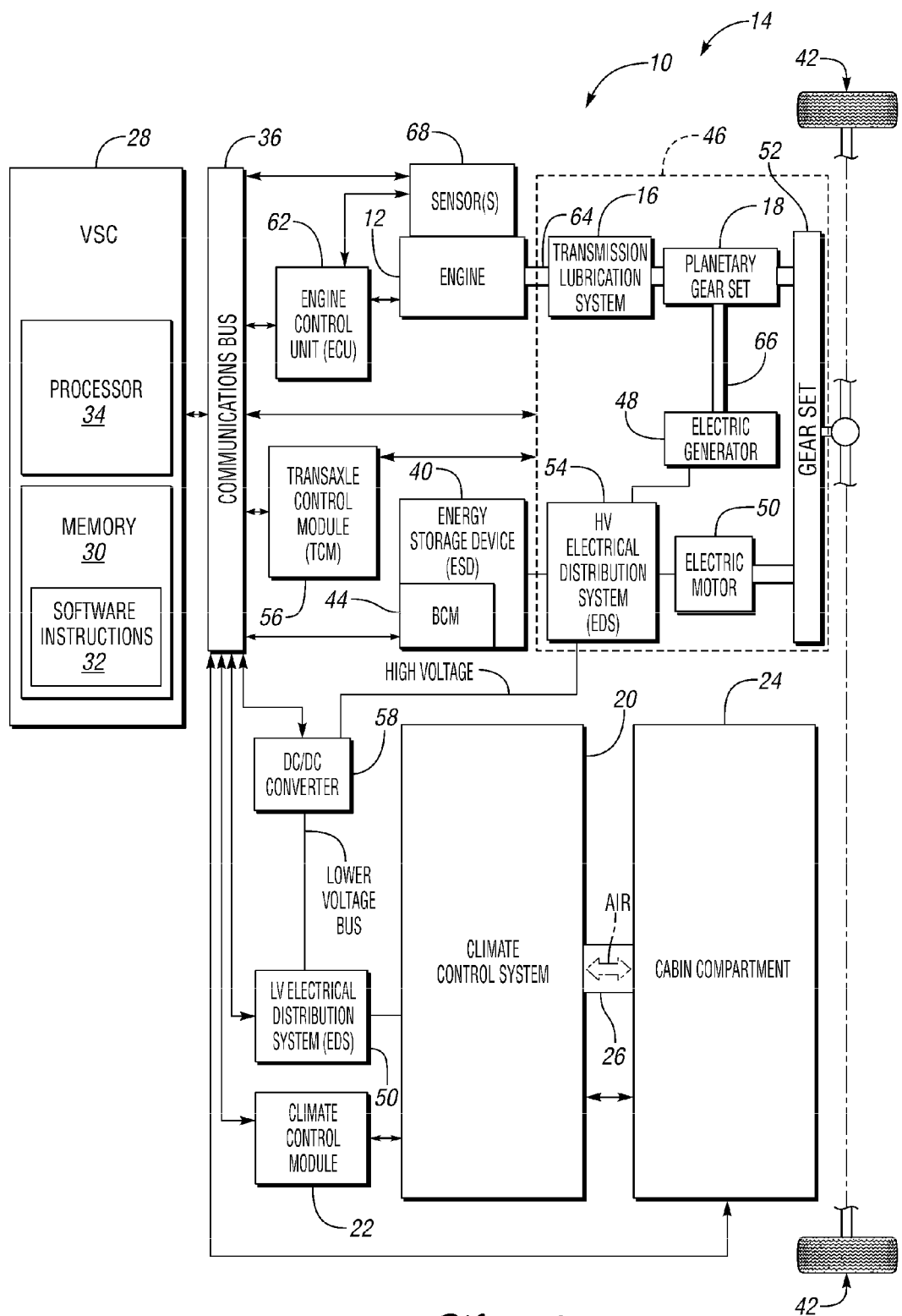
FIG. 1 is a schematic diagram illustrating a hybrid electric vehicle (HEV) including an engine as well as a system for initiating starting of the engine for a first time since a vehicle drive start request in accordance with an embodiment of the present invention.

With reference to FIG. 1, a system 10 is provided for initiating starting of an engine 12 in a hybrid electric vehicle 14 (hereinafter "HEV") for a first time since a vehicle drive start request in accordance with an embodiment of the present invention. For example, the vehicle drive start request may represent a request to start the electric operation of the HEV 14. The system 10 of FIG. 1 is shown integrated with a powertrain of a parallel/series hybrid electric vehicle (PSHEV). However, the system 10 may be integrated with other powertrain configurations, such as a series hybrid electric vehicle (SHEV) and a parallel hybrid electric vehicle (PHEV). The system 10 and its method of operation are described in a general fashion to facilitate understanding of various aspects of the system 10 and method.

The engine 12 of FIG. 1 is shown as an internal combustion engine (ICE). The engine 12 may consume gasoline, diesel, or other combustible fuel to power the engine 12. Alternatively, the engine 12 can be any type of energy generation unit that generates heat during operation in the HEV 14. Being an energy generation unit in the HEV 14, the engine 12 can be started for the first time when the HEV 14 is operating in an electric drive mode, such as when the start request causes the HEV 14 to start in the electric drive mode.

As shown in FIG. 1, the HEV 14 can include a transmission lubrication system 16. The engine 12 provides torque for or drives the transmission lubrication system 16 to lubricate transmission elements in the HEV 14. Transmission elements in the HEV 14 may include a planetary gear set 18, a torque converter, as well as other powertrain elements in the HEV 14. In one example, the transmission lubrication system 16 may include a transmission oil pump to lubricate the planetary gear set 18 and other powertrain elements. In such an example, the engine 12 is started to drive the transmission oil pump and provide pressurized oil to lubricate the planetary gear set 18.

With continuing reference to FIG. 1, the HEV 14 includes a climate control system 20. In addition, the HEV 14 may include a climate control module 22 to control operation of the climate control system 20. More specifically, the climate control module 22 may control how the climate control system 20 provides conditioned air to a cabin compartment 24 in the HEV 14. "Conditioned air" refers to cooled air, heated air, or both cooled and heated air depending on the operation of the climate control system 20. The climate control system 20 may include a heating ventilating and air conditioning (HVAC) system to selectively provide the cooled and/or heated air to the cabin compartment 24. For heating the cabin compartment 24, the engine 12 may heat an engine coolant that is channeled through a heater core, while the climate control system 20 forces air across the heater core to transmit the heated air to the passenger compartment 24. Transmitting heated air to the cabin compartment 24 increases the temperature of air in the cabin compartment 24 and, therefore can increase passenger comfort in the HEV 14.

Referring again to FIG. 1, the HEV 14 includes one or more air ducts 26. The air ducts 26 channel the conditioned air from the climate control system 20 to the cabin compartment 24. For example, the ducts 26 may channel the air into the cabin compartment 24 through air vents (not shown) opening into the cabin compartment 24.

As illustrated in FIG. 1, the system 10 includes a controller 28 or some other type of programmable logic device to control various components in the HEV 14, such as the transmission lubrication system 16 and the climate control module 22. The controller 28 of FIG. 1 is shown as a combination of a vehicle system controller (VSC) and a powertrain control module (PCM). The combination of the VSC and the PCM is hereinafter referenced as a "VSC" having reference numeral 28. Although the VSC 28 is shown as a single hardware device, the VSC 28 may include multiple controllers in the form of multiple hardware devices, or multiple software controllers within one or more hardware devices.

As shown in FIG. 1, the system 10 may include a computer-readable storage medium or memory 30 (hereinafter "memory"). The memory 30 stores various data or information, such as the software instructions 32, a computer program, and/or algorithm, which may be embedded or encoded with the method. In addition to storing the software instructions 32, the memory 30 can store data or information about the various operating conditions or components in the HEV 14. For example, the memory 30 may store predetermined coolant temperatures, filter parameters, predetermined oil temperatures, times lapsed since a last run of the engine 12, how long the engine 12 operated during its last run, predetermined levels of power, predetermined speeds of the HEV 14, predetermined distances of the HEV 14, or some combination thereof. In addition, such data or information may be used to implement the method of initiating starting of the engine 12 for the first time since the vehicle drive start request.

The memory 30 can be part of the VSC 28 as shown in FIG. 1. However, the memory 30 may be positioned in any suitable portion or portions in the HEV 14 accessible by the VSC 28. For example, the memory 30 may be positioned in the climate control module 22, the VSC 28, or a combination of the climate control module 22 and the VSC 28.

As shown in FIG. 1, the VSC 28 includes a processor 34, such as an electronic integrated circuit or microprocessor. The processor 34 operates to execute a set of the software instructions 32, the computer program, and/or the algorithm in the memory 30.

As shown in FIG. 1, the HEV 14 can include a communications bus or vehicle communications bus 36 (hereinafter "communications bus"). The communications bus 36 is in communication with various components of the HEV 14 including one or more controllers of the system 10, such as the VSC 28 and/or the climate control module 22. The VSC 28 of FIG. 1 is shown to communicate with the climate control module 22 through the communications bus 36. The communications bus 36 may be implemented as a controller area network (CAN), a local interconnect network (LIN), or any such suitable data-communication link that can transfer data between the VSC 28 and other devices in the HEV 14.

As illustrated in FIG. 1, the HEV 14 includes an energy storage device (ESD) 40 (hereinafter "battery"), such as an electric storage battery. The battery 40 of FIG. 1 is a high-voltage battery that outputs and stores high-voltage electric power. However, other types of energy storage devices and output devices can be used to operate the HEV 14 in the electric drive mode. For example, the battery 40 may be an ultra-capacitor or a mechanical flywheel unit that can store and output energy for propelling a set of drive wheels 42 of the HEV 14.

The battery 40 of FIG. 1 includes a controller, such as a battery control module (BCM) 44, to control electric power to and from the battery 40. The VSC 28 and/or the BCM 44 may determine a state of charge (SOC) of the battery 40 to determine when the battery 40 needs to be charged. In addition, the BCM 44 can control charging of the battery 40 as well as how the battery 40 provides power to the system 10 before starting the engine 12 in the electric drive mode.

As shown in FIG. 1, the HEV 14 includes a transaxle 46. The transaxle 46 includes the planetary gear set 18, an electric generator 48, an electric motor 50, a gear set 52, and a high-voltage electrical distribution system 54 (hereinafter "high-voltage EDS"). The transaxle 46 is coupled between the drive wheels 42 and the engine 12 and battery 40 to control how and when power is transferred to the high-voltage EDS 54, the drive wheels 42, and/or the battery 40.

Referring to FIG. 1, the transaxle 46 includes one or more controllers, such as a transaxle control module (TCM) 56, to control specific components within the transaxle 46. For example, the TCM 56 can control the electric generator 48 and the electric motor 50 to operate as motors that output torque. In addition, the TCM 56 can control the electric generator 48 and the electric motor 50 to operate as generators that output high-voltage electric power to the high-voltage EDS 54.

As illustrated in FIG. 1, the planetary gear set 18 of the transaxle 46 mechanically connects the engine 12 and the electric generator 48. Furthermore, the planetary gear set 18 includes a ring gear, a carrier, planet gears, and a sun gear. Alternatively, the planetary gear set 18 may be a different type of gear set or transmission for coupling the engine 12 to the electric generator 48.

As shown in FIG. 1, the high-voltage EDS 54 is in high-voltage electrical communication with a DC-to-DC converter 58 (hereinafter "DC/DC converter"), the electric generator 48, the electric motor 50, and the battery 40. In operation, the high-voltage EDS 54 distributes high-voltage electric power to and from the electric generator 48, the electric motor 50, and the battery 40. The DC/DC converter 58 converts high-voltage electric power from the high-voltage EDS 54 to low-voltage electric power.

As shown in FIG. 1, the HEV 14 may include a low-voltage electrical distribution system 60 (hereinafter "low-voltage EDS"). The low-voltage EDS 60 receives low-voltage electric power from the DC/DC converter 58 and distributes the low-voltage electric power to various low-voltage devices or components in the HEV 14, such as the climate control system 20.

As depicted in FIG. 1, the HEV 14 includes an engine control unit 62, which may include an electronic throttle control (ETC) system. The ECU 62 of FIG. 1 controls the engine 12 either alone or in combination with the VSC 28. Thus, the ECU 62 can control when to initiate starting of the engine 12 as well as when the engine 12 drives the transmission lubrication system 16.

When the engine 12 in the HEV 14 is started, the planetary gear set 18 may receive mechanical power from the engine 12 through shaft 64 and transfer the mechanical power either to the drive wheels 42 through gear set 52 or to the electric generator 48 through shaft 66. In addition to receiving power from the engine 12, the planetary gear set 18 may receive power from the electric generator 48. The transmission lubrication system 16 provides lubrication for the planetary gear set 18 as well as other transmission elements in the HEV 14 to prevent damage or degradation to the transaxle 46 when the planetary gear set 18 is transferring torque or power from the engine 12 through shafts 64, 66.

Referring to FIG. 1, the electric generator 48 can be used as either an electric motor, a machine that converts mechanical energy into electrical energy, or both. Operating as an electric motor, the electric generator 48 outputs torque to shaft 66. Shaft 66 is connected to the planetary gear set 18. In addition, the electric generator 48 may provide a reaction torque via the planetary gear set 18 to control speed of the engine 12. Operating as a machine that converts mechanical energy into electric energy, the electric generator 48 outputs high-voltage electric power to the high-voltage EDS 54.

As shown in FIG. 1, the HEV 14 may include one or more sensors 68. The sensors 68 are disposed near the engine 12 to sense various parameters of the engine 12 and to transmit the parameters of the engine 12 to the ECU 62 and/or the VSC 28 via the communications bus 36. As shown in FIG. 1, the VSC 28 may receive and process signals from the sensor(s) 68, the engine control unit 62, the transaxle 46, the TCM 56, the BCM 44, the DC/DC converter 58, the low-voltage EDS 60, the climate control module 22, or a combination thereof through the communications bus 36.

At least one of the sensors 68 of FIG. 1 can be a temperature sensor that obtains an indication of engine coolant temperature. For example, the temperature sensor may sense a temperature level of a cylinder head in the engine 12 and transmit the temperature level to the VSC 28 and/or the ECU 62. In another example, the temperature sensor may sense a temperature directly from the engine coolant passing through the heater core to obtain the engine coolant temperature. The VSC 28 can process sensor signals from the temperature sensor to determine the engine coolant temperature. For example, the VSC 28 may estimate or determine the engine coolant temperature based on the temperature level of the cylinder head in the engine 12.

In addition to the signals from the sensors 68, the VSC 28 can receive other signals having information to operate the system 10 or to control other components in the HEV 14. For example, the VSC 28 may receive a signal embedded or encoded with a vehicle drive start request for initiating starting of the HEV 14. The signal with the vehicle drive start request may be generated based on any suitable device that can indicate or request starting of the HEV 14. For example, an ignition system can request starting of the HEV 14 based on ignition position, a push button, remote start, or other suitable input device that the user can control to generate the vehicle drive start request. The VSC 28 and/or the ECU 62 may receive the vehicle drive start request to initiate starting of the engine 12, starting the electric operation of the HEV 14, or both initiating starting of the engine 12 and starting the electric drive mode of the HEV 14. Electric operation of the HEV 14 allows the electric motor 50 to operate as a motor, as a generator, or as both to provide electric power to operate the HEV 14. For example, electric operation of the HEV 14 can be used to drive the drive wheels 42 and propel the HEV 14.

The VSC 28 uses the vehicle drive start request as well as other the information to control the transmission lubrication system 16 and the climate control system 20. For example, the VSC 28 may obtain the speed of the engine 12, temperature settings from the climate control module 22, an amount of time that has lapsed since a last run of the engine 12, how long the engine 12 operated during the last run, an ambient temperature outside the HEV 14 as well as various information from memory 30 outside the VSC 28, such as predetermined coolant temperatures, filter parameters, predetermined oil temperatures, predetermined levels of power, predetermined speeds, and predetermined distances of the HEV 14.

Figure 2:
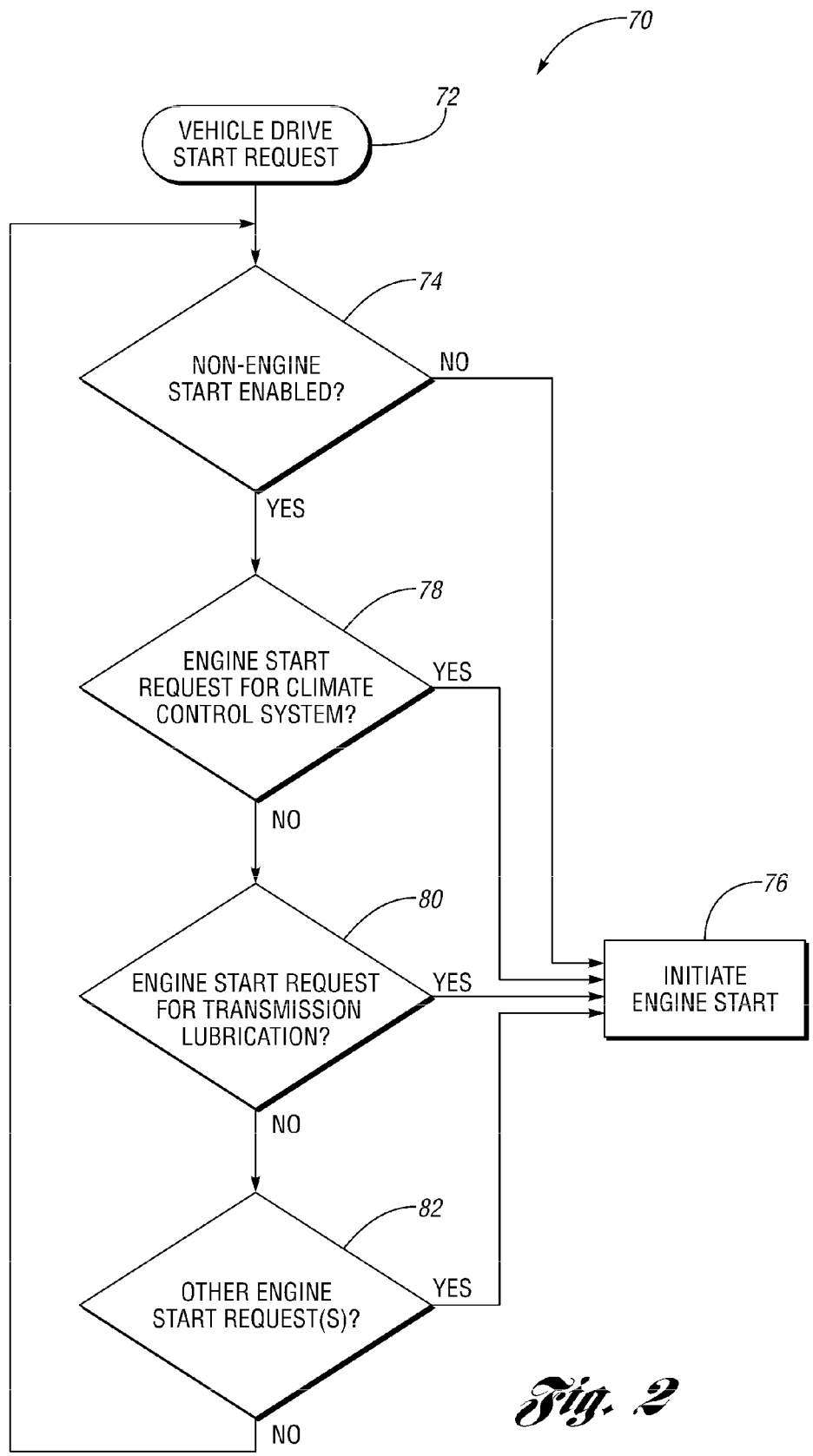
FIG. 2 is a flowchart diagram illustrating a method of initiating starting of the engine in the HEV for a first time since a vehicle drive start request in accordance with an embodiment of the present invention.

With reference to FIG. 2, a flowchart diagram 70 is generally provided to illustrate steps of a method of initiating starting of an engine in a hybrid electric vehicle (HEV) for a first time since a vehicle drive start request in accordance with an embodiment of the present invention. Starting the engine can be used to heat the engine as well as provide transmission lubrication in the HEV 14. In addition to the steps shown in FIG. 2, a programmable logic device may be programmed with additional steps to provide additional functionality. Although the various steps shown in the flowchart diagram 70 appear to occur in a chronological sequence, at least some of the steps may occur in a different order, and some steps may be performed concurrently or not at all.

Figure 3:
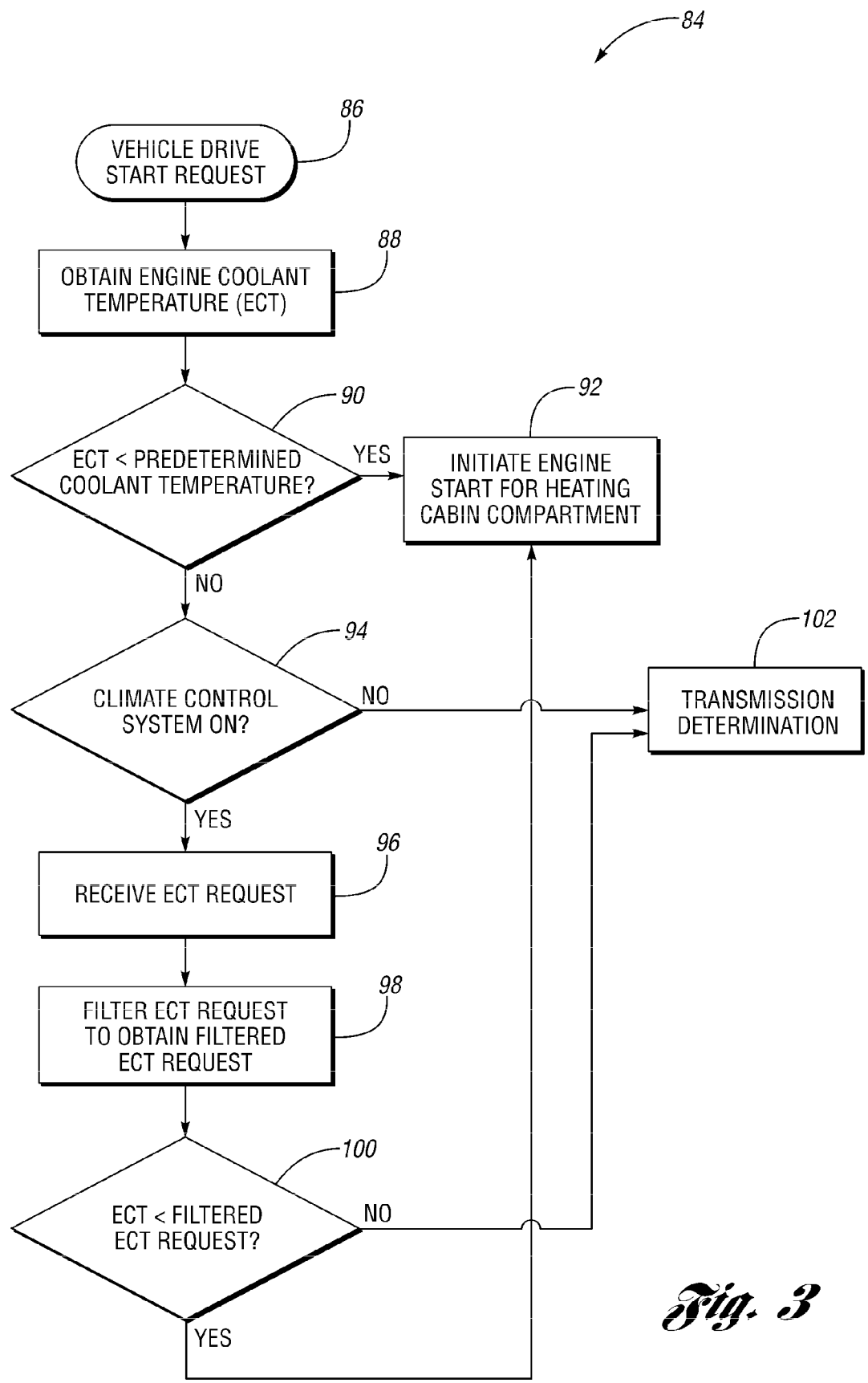
FIG. 3 is a flowchart diagram illustrating a method of initiating starting of the engine for a first time since a vehicle drive start request for heating of a cabin compartment in the HEV in accordance with an embodiment of the present invention.
Figure 4:
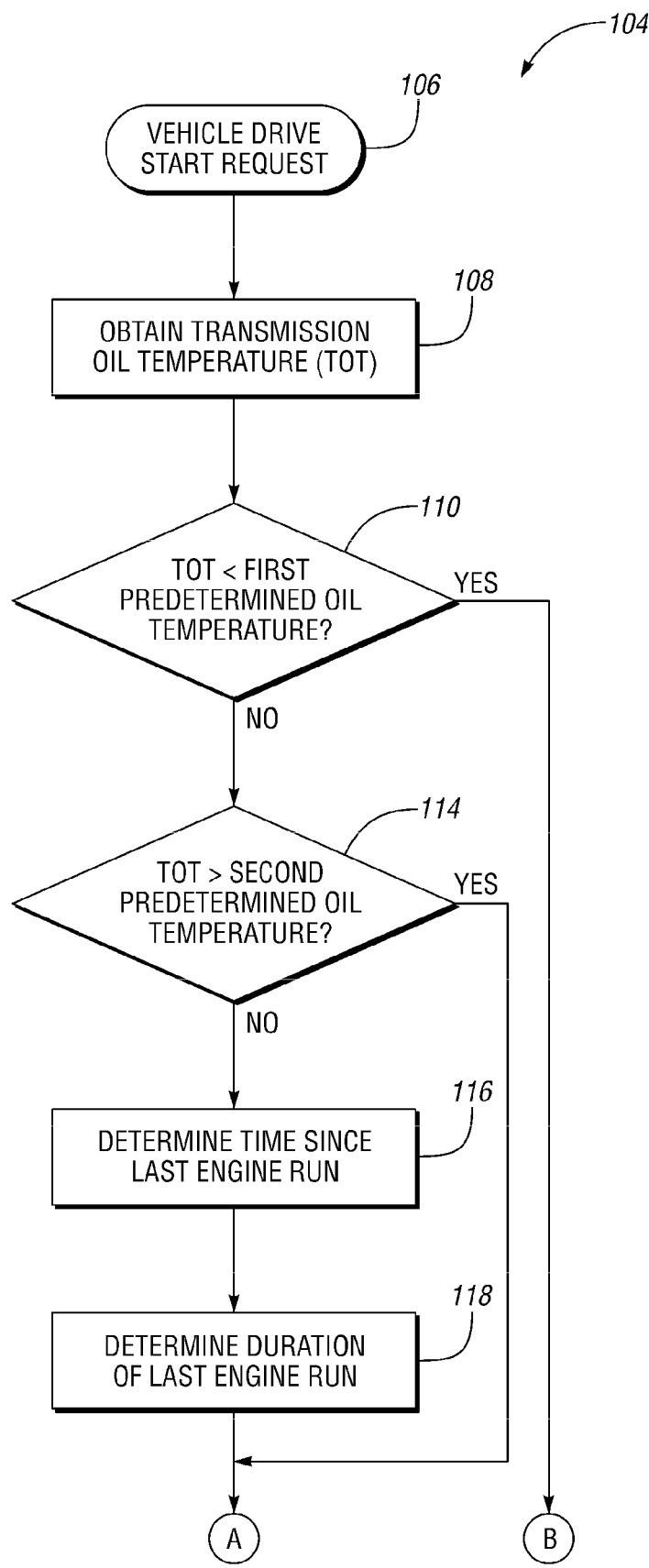
FIG. 4 is a flowchart diagram illustrating a method of initiating starting of the engine for a first time since a vehicle drive start request for transmission lubrication in the HEV in accordance with an embodiment of the present invention.
Figure 4:
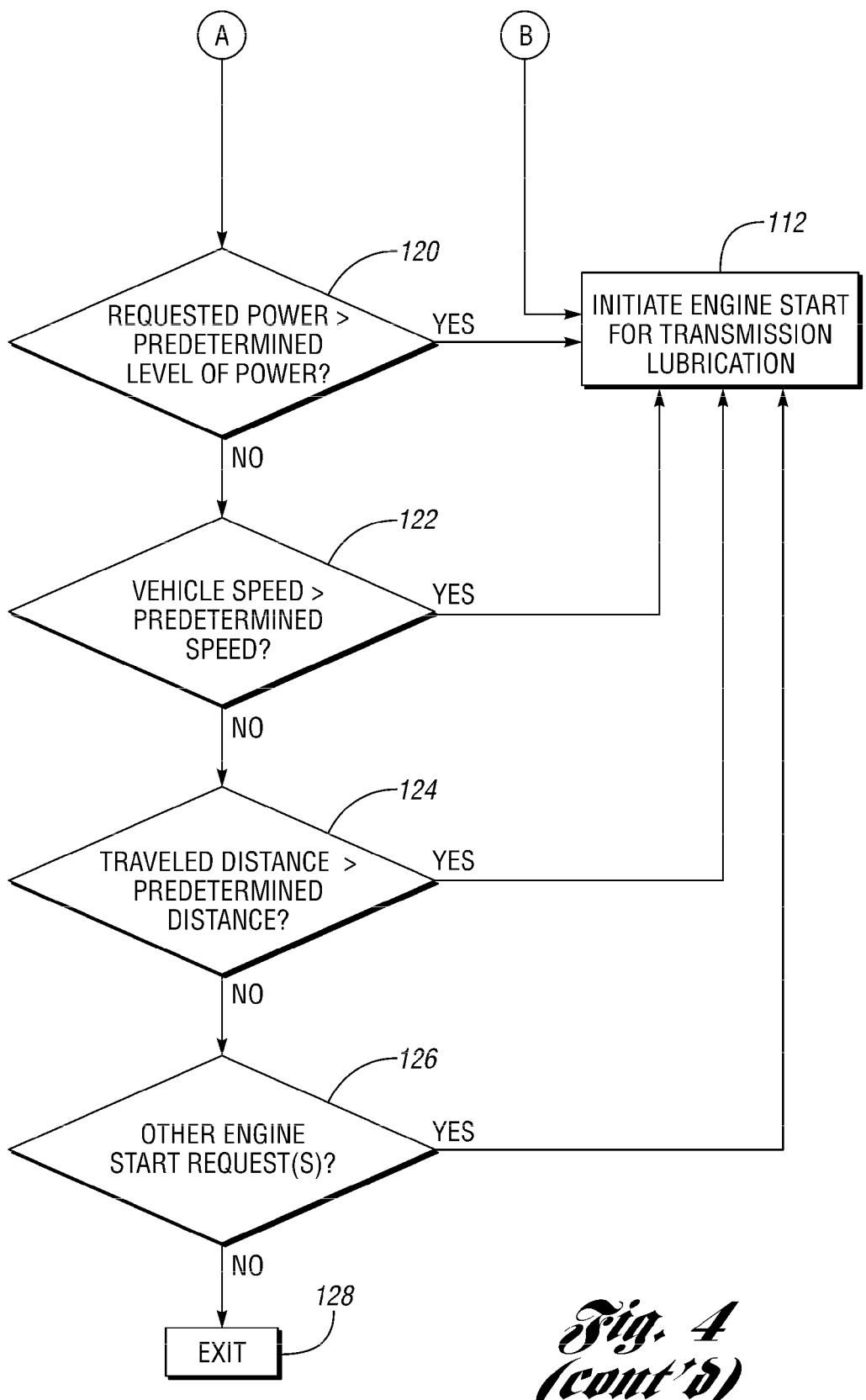

With reference to FIGS. 2-4, the HEV 14 and its components illustrated in FIG. 1 are referenced throughout the discussion of the method to facilitate understanding of various aspects of the method. The method of initiating starting of the engine 12 in the HEV 14 may be implemented through a computer algorithm, machine executable code, or a software program programmed into a suitable programmable logic device(s) of the HEV 14, such as the VSC 28, the engine control unit 62, the climate control module 22, other controller in the HEV 14, or a combination thereof.

At block 72 of flowchart diagram 70, a vehicle drive start request occurs. The vehicle drive start request represents a request or desire to start the electric operation of the HEV 14, to start the engine 12, or to start both to drive the HEV 14. The vehicle drive start request may be generated based on any suitable device that can indicate or request starting of the HEV 14. The VSC 28 either alone or in combination with the ECU 62 can receive a signal embedded or encoded with the vehicle drive start request to determine whether the vehicle drive start request has occurred.

At decision block 74, it is determined whether a non-engine start is enabled. The non-engine start refers to starting of the HEV 14 without starting the engine 12, such as only starting the electric operation of the HEV 14. The VSC 28 may determine whether the non-engine start is enabled based on any suitable information or condition. The start of the HEV 14 may default to having the non-engine start enabled so that the VSC 28 determines whether to start the HEV 14 using the engine 12, the electric operation of the HEV 14, or both depending on power demands on the HEV 14 when the VSC 28 obtains the vehicle drive start request. If the non-engine start is enabled, then decision block 78 occurs. However, block 76 occurs if the non-engine start is disabled or otherwise not enabled.

At block 76 of flowchart diagram 70, an engine start is initiated. The VSC 28 either alone or in combination with the ECU 62 may determine when to initiate starting of the engine 12 in the HEV 14. The VSC 28 may initiate starting of the engine 12 when the VSC 28 determines that the engine 12 is needed for heating of the cabin compartment 24 in the HEV 14. In addition, the VSC 28 may initiate starting of the engine 12 to provide energy for driving the transmission lubrication system 16, for providing additional power for propelling the HEV 14 through the drive wheels 42, or for other operations of the HEV 14.

At decision block 78, it is determined whether an engine start request has occurred for the climate control system 20. One or more of the steps as illustrated in FIG. 3 may be used to determine whether the engine start request has occurred for the climate control system 20. For example, the VSC 28 may determine whether the engine start request has occurred based on block 92 of FIG. 3 occurring. Alternatively, the VSC 28 may determine whether the engine start request has occurred for the climate control system 20 whenever the engine 12 is started for the primary purpose of heating of the cabin compartment 24 in the HEV 14. If the engine start request has occurred for the climate control system 20, then block 76 occurs to initiate starting of the engine 12. However, decision block 80 occurs if the engine start request has not occurred for heating of the cabin compartment 24.

At decision block 80, it is determined whether an engine start request has occurred for transmission lubrication. One or more of the steps as illustrated in FIG. 4 may be used to determine whether the engine start request has occurred for transmission lubrication. For example, the VSC 28 may determine whether the engine start request has occurred for driving the transmission lubrication system 16 to lubricate the planetary gear set 18 and other transmission elements in the HEV 14 based on block 112 of FIG. 4 occurring. Alternatively, the VSC 28 may determine whether the engine start request has occurred whenever the engine 12 is started for the primary purpose of lubricating transmission elements in the HEV 14, such as the planetary gear set 18, the torque converter, and other powertrain elements in the HEV 14. If the engine start request has occurred for transmission lubrication, then block 76 occurs. However, decision block 82 occurs if the engine start request has occurred neither for heating the cabin compartment 24 nor for powering the transmission lubrication system 16.

At decision block 82 of flowchart diagram 70, it is determined whether other engine start requests have occurred. For example, the VSC 28 may determine to start the engine 12 for charging the battery 40 in the HEV 14. In another example, the engine 12 may be started to provide power when the high-voltage EDS 54 is unable to deliver the power needed to operate one or more components in the HEV 14. In such an example, the driver power demand may exceed the electric drive capacity of the HEV 14. If one or more other engine start requests have occurred, then block 76 occurs to initiate starting of the engine 12. However, decision block 74 occurs if no other engine start request occurs.

Referring to FIG. 3, a flowchart diagram 84 is provided to illustrate steps of a method of initiating starting of the engine 12 for a first time since a vehicle drive start request for heating of the cabin compartment 24 in the HEV 14 in accordance with an embodiment of the present invention. Although the various steps shown in the flowchart diagram 84 appear to occur in a chronological sequence, at least some of the steps may occur in a different order, and some steps may be performed concurrently or not at all. In addition, the method of initiating starting of the engine 12 for the first time since the vehicle drive start request for heating can be used for decision block 78 of FIG. 2.

At block 86 of flowchart diagram 84, a vehicle drive start request occurs. Like block 72 of flowchart diagram 70, the VSC 28 either alone or in combination with the ECU 62 may receive a signal embedded or encoded with the vehicle drive start request to determine whether the vehicle drive start request has occurred. In addition, block 86 (shown in FIG. 3) may correspond to block 72 of flowchart diagram 70 (shown in FIG. 2).

At block 88 of flowchart diagram 84, an indication of engine coolant temperature (ECT) is obtained. The ECT refects the temperature of the engine 12 in the HEV 14. Thus, the indication of ECT may be a temperature level of a cylinder head in the engine 12 or a temperature obtained directly from coolant of the engine 12. The VSC 28 and/or the ECU 62 may be used to obtain the indication of ECT.

At decision block 90, the indication of ECT obtained at block 88 is compared to a predetermined coolant temperature. The predetermined coolant temperature is stored in the memory 30 and represents the lowest temperature of engine coolant allowed for electric operation of the HEV 14 without using the engine 12. For example, the predetermined coolant temperature may be a temperature between zero and twenty degrees Fahrenheit (0-20° F.). Thus, for example, the predetermined coolant temperature may be 10° F.

Referring again to decision block 90, when the ECT obtained at block 88 is below the predetermined coolant temperature, the HEV 14 is in a relatively cold temperature environment and the air temperature in the cabin compartment 24 is assumed to below a desired or comfortable temperature. The comfortable temperature refers to an air temperature in the cabin compartment 24 that generally would not feel cold to a passenger in the HEV 14. For example, the comfortable temperature may be sixty-five degrees Fahrenheit (65° F.). If the ECT is less than the predetermined coolant temperature, then block 92 occurs for heating the cabin compartment 24 in the HEV 14. However if the ECT is greater than or equal to the predetermined coolant temperature, then decision block 94 occurs.

At block 92 shown in FIG. 3, an engine start is initiated for heating the cabin compartment 24 in the HEV 14. For example, block 92 may correspond to block 76 of flowchart diagram 70. Similarly, the VSC 28 either alone or in combination with the ECU 62 may determine when to initiate starting of the engine 12. Furthermore, the VSC 28 and/or the ECU 62 may be used to initiate starting of the engine 12 for heating the cabin compartment 24.

At decision block 94, it is determined whether a climate control system is ON. The VSC 28 either alone or in combination with the climate control module 22 may determine whether the climate control system is ON or OFF. If the climate control system is ON, then block 96 occurs. If however the climate control system is OFF, or otherwise not ON, then block 102 occurs. Block 102 of FIG. 3 may correspond to decision block 80 of FIG. 2.

At block 96, an engine coolant temperature (ECT) request is obtained. For example, the ECT request may be one-hundred and forty degrees Fahrenheit (140° F.). The climate control module 22 may obtain the ECT request based on one or more sensors in the cabin compartment 24, a window defrost settings, temperature settings for the climate control system 20, or a combination thereof. Thus, the ECT request may vary depending on the operation of the climate control system 20. For example, the temperature level of the ECT request may increase significantly when the window defrost is selected since selection of the window defrost may indicate that the HEV 14 is in a relatively cold temperature environment.

At block 98, the ECT request is filtered to obtain a filtered ECT request. The filtered ECT request indicates an amount of heat needed from the engine 12 for heating the cabin compartment 24 to a predetermined cabin temperature. For example, the predetermined cabin temperature may be sixty-five degrees Fahrenheit (65° F.) and stored in the memory 30.

Referring again to block 98, the VSC 28 may filter the ECT request obtained at block 96 to obtain the filtered ECT request. Filtering the ECT request is based on various information or data, such as the ambient temperature outside the HEV 14, the indication of ECT request obtained at block 96, as well as other information indicating the air temperature in the cabin compartment 24 and/or the temperature of the engine 12. The VSC 28 may select or modify filtering parameters used to filter the ECT request in an effort to optimize a balance between heating of the cabin compartment 24 and consuming fuel for starting the engine 12 to heat the engine coolant.

With continuing reference to block 98, the ambient temperature outside the HEV 14 can be used to indicate the air temperature in the cabin compartment 24 since the HEV 14 loses heat at a greater rate in a colder temperature environment than in a relatively warmer temperature environment. The temperature level of filtered ECT request may be directly proportional to the ambient temperature outside the HEV 14. Thus, the temperature level of the filtered ECT request may decrease as the ambient temperature decreases. Similarly, the temperature level of the filtered ECT request may decrease as the ECT request obtained at block 96 decreases.

At decision block 100, the filtered ECT request obtained at block 98 is compared to the ECT obtained at block 88. For example, the VSC 28 may determine whether the ECT obtained at block 88 is less than the filtered ECT request. When the ECT obtained at block 88 is greater than or equal to the filtered ECT request, the VSC 28 may determine or presume that the cabin compartment 24 in the HEV 14 contains a sufficient amount of heat so that the air temperature in the cabin compartment 24 is at least the predetermined cabin temperature (e.g., 65° F.). Thus, VSC 28 may determine not to start the engine 12 for purpose of generating heat for the cabin compartment 24 unless the cabin compartment 24 achieves an air temperature lower than the predetermined cabin temperature. If the ECT obtained at block 88 is great than or equal to the filtered ECT, then block 102 occurs. However if the ECT obtained at block 88 is less than the filtered ECT, then block 92 occurs for heating the cabin compartment 24 in the HEV 14.

At block 102, a transmission lubrication determination occurs. Block 102 of flowchart diagram 84 corresponds to decision block 80 of flowchart diagram 70, one or more steps of flowchart diagram 104, neither decision block 80 nor flowchart diagram 104, or both depending on the implementation of method of initiating starting of the engine 12 for a first time since a vehicle drive start request for heating the cabin compartment 24 in the HEV 14.

With reference to FIG. 4, a flowchart diagram 104 is provided to illustrate steps of a method of initiating starting of the engine 12 for a first time since a vehicle drive start request for transmission lubrication in the HEV 14 in accordance with an embodiment of the present invention. Although the various steps shown in the flowchart diagram 104 appear to occur in a chronological sequence, at least some of the steps may occur in a different order, and some steps may be performed concurrently or not at all. In addition, the method of initiating starting of the engine 12 for the first time for transmission lubrication can be used for decision block 80 of FIG. 2.

At block 106 of flowchart diagram 104, a vehicle drive start request occurs. Like blocks 72, 86, the VSC 28 either alone or in combination with the ECU 62 may receive a signal embedded or encoded with the vehicle drive start request to determine whether the vehicle drive start request has occurred. In addition, block 106 shown in FIG. 4 may correspond to block 72 of flowchart diagram 70 shown in FIG. 2.

At block 108, an indication of transmission oil temperature (TOT) is obtained. TOT represents the temperature of transmission oil used to lubricate transmission elements of the HEV 14, such as the planetary gear set 18, the torque converter, and other powertrain elements in the HEV 14. Flowchart diagram 104 references transmission oil, however any other suitable lubricant can be used to implement the method of initiating starting of the engine 12 for the first time for transmission lubrication in the HEV 14.

With continuing reference to block 108, the transmission lubrication system 16 may obtain the indication of TOT either alone or in combination with the ECU 62 and/or the VSC 28. For example, the transmission lubrication system 16 may include a sensor to sense a temperature of the transmission oil flowing in the transaxle 46 for obtaining the indication of TOT. Thus, the TOT may be obtained directly from transmission oil in the HEV 14.

At decision block 110, the TOT obtained at block 108 is compared to a first predetermined oil temperature. For example, the first predetermined oil temperature may be a temperature between zero and ten degrees Fahrenheit (0-10° F.) When the TOT is less than the first predetermined oil temperature, the VSC 28, the ECU 62, the transmission lubrication system 16 or a combination thereof may determine that the engine 12 should be started for the transmission lubrication system 16 to lubricate one or more transmission elements in the HEV 14, such as the planetary gear set 18. If the TOT is less than the first predetermined oil temperature, then block 112 occurs. However if the TOT is greater than or equal to the first predetermined oil temperature, then decision block 114 occurs.

At block 112 shown in FIG. 4, an engine start is initiated for transmission lubrication. For example, block 112 may correspond to block 76 of flowchart diagram 70. Similarly, the VSC 28 either alone or in combination with the ECU 62 may determine when to initiate starting of the engine 12 for the first time for transmission lubrication. For example, the engine 12 may be started to drive the transmission lubrication system 16 of FIG. 1, such as a transmission oil pump. With power from the engine 12, the transmission lubrication system 16 can lubricate various transmission elements in the HEV 14, such as the planetary gear set 18, the torque converter in the HEV 14, or other powertrain elements in the HEV 14.

At decision block 114, the TOT obtained at block 108 is compared to a second predetermined oil temperature. The second predetermined oil temperature is greater than the first predetermined oil temperature used at decision block 110. For example, the second predetermined oil temperature may be a temperature between eighty and one-hundred and fifty degrees Fahrenheit (80-150° F.), such as 110° F. When the TOT is greater than the second predetermined oil temperature, the VSC 28 and/or the ECU 62 may determine that transmission elements of the HEV 14, such as the planetary gear set 18, are sufficiently lubricated for purposes of the vehicle drive start request and that the engine 12 does not need to be started for the transmission lubrication at this time. If the TOT is greater than the second predetermined oil temperature, then decision block 120 occurs. However if the TOT is less than or equal to the second predetermined oil temperature, then block 116 occurs.

At block 116, a time since last engine run is determined. The VSC 28 and/or the ECU 62 may determine the time since the engine 12 was last run or in operation. For example, the VSC 28 may determine the time as the amount of time that has lapsed since the engine 12 was switched off or no longer running. For example, if the engine 12 was switched off 12 hours ago then the time since last engine run is 12 hours.

With continuing reference to block 116, the time since last engine run can indicate how much transmission lubricant has drained from transmission elements of the HEV 14 to the transmission lubrication system 16. For example, the time since last engine run may correspond to a percentage of transmission oil that has drained from the planetary gear set 18 back to the transmission oil pump. The degree of transmission lubrication is inversely proportional to the time since last engine run. Thus, as the time since last engine run increases the degree of transmission lubrication in the HEV 14 decreases.

At block 118, duration of last engine run is determined. The VSC 28 and/or the ECU 62 may determine the duration as an amount of time that the engine 12 operated continuously without stopping during the last engine run. For example, the VSC 28 may determine the duration as the amount of time between the previous starting of the engine 12 and previous stopping of the engine 12. For example, the duration of last engine run may be 10 minutes or 1 hour.

Referring again to block 118, the duration of last engine run indicates how much transmission lubricant has covered or soaked the transmission elements in the HEV 14. For example, the duration of last engine run may correspond a soak time of the planetary gear set 18. The degree of transmission lubrication is directly proportional to the duration of last engine run. Thus, as the duration of last engine run increases the degree of transmission lubrication in the HEV 14 increases.

At decision block 120, a requested power is compared to a predetermined level of power. The requested power refers to an amount of power requested of the HEV 14 to perform one or more operations, such as to accelerate the HEV 14 and/or operate the climate control system 20. For example, the requested power may be obtained from high-voltage EDS 54 to propel the HEV 14 through the drive wheels 42. In such an example, the requested power may be based on an accelerator pedal position sensor that senses depression of an accelerator pedal in the HEV 14. Thus, the requested power may be based on power demanded by the driver of the HEV 14.

Referring again to decision block 120, the predetermined power level may be based on time since last engine run (see block 116), the duration of the last engine run (see block 118), or both. For example, the predetermined level of power may be inversely proportional to the time since last engine run and directly proportional to the duration of last engine run. Thus, the VSC 28 may decrease the predetermined level of power as the time since the engine 12 was last run increases because the need or desire for transmission lubrication for a given requested power may increase with longer lapses of time since the last engine run. Furthermore, the VSC 28 may decrease the predetermined level of power as the duration of the last engine run decreases because the need or desire for transmission lubrication for a given requested power may increase with shorter durations of operating the engine 12.

With continuing reference to decision block 120, the VSC 28 either alone or in combination with the ECU 62 may compare the requested power to the predetermined level of power. For example, the VSC 28 may determine whether the requested power is greater than the predetermined level of power. If the requested power is greater than the predetermined level of power, then the VSC 28 may determine that the engine 12 needs to be started to provide transmission lubrication in the HEV 14 and block 112 occurs. Using requested power to determine whether to initiate starting of the engine 12 in the HEV 14 for transmission lubrication may be useful or desirable when torque or power for propelling the HEV 14 exceeds the predetermined level of power, such as when a driver of the HEV 14 tries to accelerate the HEV 14 at a relatively high rate. If the requested power is less than or equal to the predetermined level of power, then the VSC 28 may determine not to start the engine 12 for purpose of transmission lubrication unless the requested power subsequently exceeds the predetermined level of power. Decision block 122 occurs if the requested power is not greater than the predetermined level of power.

At decision block 122, a vehicle speed is compared to a predetermined speed. The vehicle speed generally refers to the speed of the HEV 14. Any suitable device in the HEV 14 can provide information indicating the speed of the HEV 14 to the VSC 28. For example, the VSC 28 and/or the TCM 56 may determine the speed of the HEV 14 based on a number of revolutions of the drive wheels 42 for a known time. The speed of the HEV 14 can be expressed in revolutions per minute (RPM) or any other suitable form for the VSC 28.

The predetermined speed at decision block 122 may be based on time since last engine run (see block 116), the duration of the last engine run (see block 118), or both. For example, the predetermined speed may be inversely proportional to the time since last engine run and directly proportional to the duration of last engine run. Thus, the VSC 28 may decrease the predetermined speed as the time since the engine 12 was last run increases because the need or desire for transmission lubrication for a given vehicle may increase with longer lapses of time since the last engine run. Furthermore, the VSC 28 may decrease the predetermined speed as the duration of the last engine run decreases because the need or desire for transmission lubrication for a given vehicle speed may increase with shorter durations of operating the engine 12.

Referring again to decision block 122 of flowchart diagram 104, the VSC 28 either alone or in combination with the ECU 62 may compare the vehicle speed to the predetermined speed. For example, the VSC 28 may determine whether the vehicle speed is greater than the predetermined speed. If the vehicle speed is greater than the predetermined speed, then the VSC 28 may determine that the engine 12 needs to be started to provide transmission lubrication in the HEV 14 and block 112 occurs. Using vehicle speed to determine whether to initiate starting of the engine 12 in the HEV 14 for transmission lubrication may be useful or desirable when the speed of the HEV 14 is high, but the requested power to propel the HEV 14 is low or zero, such as when the HEV 14 is rolling downhill. If the vehicle speed is less than or equal to the predetermined speed, then the VSC 28 may determine not to start the engine 12 for purpose of transmission lubrication unless the speed of the HEV 14 subsequently exceeds the predetermined speed. Decision block 124 occurs if the vehicle speed is not greater than the predetermined speed.

At decision block 124, a traveled distance is compared to a predetermined distance. The traveled distance generally refers to a distance that the HEV 14 has traveled since the vehicle drive start request. For example, the traveled distance may be 5 miles or 50 miles. Any suitable device in the HEV 14 can provide information indicating the distance traveled by the HEV 14. For example, the VSC 28 may determine the traveled distance based on the number of revolutions of the drive wheels 42 since the vehicle drive start request.

The predetermined distance at decision block 124 may be based on time since last engine run (see block 116), the duration of the last engine run (see block 118), or both. For example, the predetermined distance may be inversely proportional to the time since last engine run and directly proportional to the duration of last engine run. Thus, the VSC 28 may decrease the predetermined distance as the time since the engine 12 was last run increases because the need or desire for transmission lubrication for a given traveled distance may increase with longer lapses of time since the last engine run. Furthermore, the VSC 28 may decrease the predetermined distance as the duration of the last engine run decreases because the need or desire for transmission lubrication for a given traveled distance may increase with shorter durations of operating the engine 12.

With continuing reference to decision block 124, the VSC 28 either alone or in combination with the ECU 62 may compare the traveled distance to the predetermined distance. For example, the VSC 28 may determine whether the traveled distance is greater than the predetermined distance. If the traveled distance is greater than the predetermined distance, then the VSC 28 may determine that the engine 12 needs to be started to provide transmission lubrication in the HEV 14 and block 112 occurs. Using traveled distance to determine whether to initiate starting of the engine 12 in the HEV 14 for transmission lubrication may be useful or desirable when the electric motor 50 is driving the drive wheels 42 without the engine 12 for a relatively long distance traveled by the HEV 14. If the traveled distance is less than or equal to the predetermined distance, then the VSC 28 may determine not to start the engine 12 for purpose of transmission lubrication unless the distance traveled by the HEV 14 subsequently exceeds the predetermined distance. Decision block 126 occurs if the traveled distance is not greater than the predetermined distance.

At decision block 126, it is determined whether other engine start request(s) have occurred. Block 126 shown in FIG. 4 may correspond to decision block 82 of flowchart diagram 70 shown in FIG. 2, since the method of initiating starting of the engine 12 for the first time for transmission lubrication can be used for decision block 80 of FIG. 2.

At block 128, an exit of the method of initiating starting of the engine 12 for the first time since the vehicle drive start request occurs. For example, block 128 may correspond to initiating starting at decision block 74 or decision block 82 of flowchart diagram 70 shown in FIG. 2.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of initiating starting of an engine in a hybrid electric vehicle (HEV) for a first time since a vehicle drive start request, comprising:
    initiating starting of the engine for a first time since the start request to provide energy for at least one of heating a cabin compartment in the HEV and lubrication of a portion of powertrain elements in the HEV after a predetermined fluid temperature exceeds a transmission oil temperature.

2. The method of claim 1 further including operating the engine to generate heat for heating of a cabin compartment in vehicle the HEV when a second predetermined fluid temperature exceeds a coolant temperature of the engine.

3. The method of claim 1 further including obtaining a requested temperature for engine coolant, processing the requested temperature and an indication of ambient temperature outside the HEV to obtain a filtered engine coolant temperature, and operating the engine to generate heat for heating of a cabin compartment in the HEV when the filtered engine coolant temperature exceeds a coolant temperature of the engine in the HEV.

4. The method of claim 3 wherein the filtered engine coolant temperature decreases as the ambient temperature decreases.

5. The method of claim 1 wherein the energy drives a transmission lubrication system in the HEV to lubricate the portion of powertrain elements.

6. The method of claim 1 further including operating the engine to lubricate the portion of powertrain elements when the energy from the engine is demanded to provide energy for driving a transmission lubrication system in the HEV based on a time since last engine run.

7. The method of claim 6 further including operating the engine to lubricate the portion of powertrain elements based on a duration of the last engine run.

8. The method of claim 1 further including operating the engine to drive a transmission lubrication system in the HEV to lubricate the portion of powertrain elements based on a power level requested from the HEV.

9. The method of claim 1 wherein the initiating starting of the engine for the lubrication occurs when the energy from the engine is demanded to provide energy for lubrication.

10. The method of claim 9 wherein the energy from the engine is demanded based on comparing a power level requested from the HEV to a predetermined level of power, the predetermined level of power being based on a time since last engine run.

11. The method of claim 9 wherein the energy from the engine is demanded based on comparing a speed of the HEV to a predetermined speed, the predetermined speed being based on a time since last engine run.

12. The method of claim 9 wherein the energy from the engine is demanded based on comparing a traveled distance of the HEV to a predetermined distance, the predetermined distance being based on a time since last engine run.

13. A system for initiating starting of an engine in a hybrid electric vehicle (HEV) for a first time since a vehicle drive start request, the system comprising:
    at least one computer-based controller including a processor operable to execute software instructions, a computer memory operable to store software instructions accessible by the processor, and a set of software instructions stored in the memory, wherein the software instructions, when executed by the processor, performs a step of:
    initiating starting of the engine for a first time since the start request to provide energy for at least one of heating a cabin compartment of the HEV and lubrication of a portion of powertrain elements in the HEV after a predetermined fluid temperature exceeds a transmission oil temperature.

14. The system of claim 13 further including a transmission lubrication system, the controller initiating starting of the engine to drive the transmission lubrication system to lubricate the portion of powertrain elements when the predetermined fluid temperature exceeds the transmission oil temperature.

15. The system of claim 13 wherein the software instructions, when executed by the processor, performs a step of operating the engine to generate heat for heating of a cabin compartment in the HEV when a second predetermined fluid temperature exceeds a coolant temperature of the engine.

16. A method of initiating starting of an engine in a hybrid electric vehicle (HEV) for a first time since a vehicle drive start request, comprising:
   initiating starting of the engine to provide energy for at least one of heating an HEV cabin and lubrication of a portion of powertrain elements after a predetermined oil temperature exceeds a transmission oil temperature and when the energy from the engine is demanded to provide energy for lubrication.

17. The method of claim 16 wherein the energy from the engine is demanded based on comparing a power level requested from the HEV to a predetermined level of power, the predetermined level of power being based on a time since last engine run.

18. The method of claim 16 wherein the energy from the engine is demanded based on comparing a speed of the HEV to a predetermined speed, the predetermined speed being based on a time since last engine run.

19. The method of claim 16 wherein the energy from the engine is demanded based on comparing a traveled distance of the HEV to a predetermined distance, the predetermined distance being based on a time since last engine run.

20. The method of claim 16 wherein the energy from the engine is demanded based on a duration of last engine run.

* * * * *